United States Patent [19]

Bretz et al.

[11] Patent Number: 4,693,747
[45] Date of Patent: Sep. 15, 1987

[54] ALLOY HAVING IMPROVED FATIGUE CRACK GROWTH RESISTANCE

[75] Inventors: Philip E. Bretz, Plum Boro; Jocelyn I. Petit, New Kensington; Ralph R. Sawtell, Squirrel Hill; Asuri K. Vasudevan, Plum Boro, all of Pa.

[73] Assignee: Aluminum Company of America, Pittsburgh, Pa.

[21] Appl. No.: 799,024

[22] Filed: Nov. 18, 1985

[51] Int. Cl.$^4$ ............................................. B22F 3/00
[52] U.S. Cl. ........................................ 75/249; 75/246; 148/11.5 R; 148/11.5 Q; 148/11.5 A; 148/12.7 R; 148/12.7 A; 148/12.7 B; 148/415; 148/417; 148/439; 419/23; 419/48; 419/54; 419/55; 420/417; 420/534

[58] Field of Search ...................... 419/23, 48, 54, 55; 148/11.5 R, 11.5 Q, 11.5 A, 12.7 A, 12.7 R, 12.7 B, 415, 417, 439; 420/534, 417; 75/246, 249

[56] References Cited

U.S. PATENT DOCUMENTS

| | | | |
|---|---|---|---|
| 4,078,951 | 3/1978 | Denzine et al. | 148/410 |
| 4,410,370 | 10/1983 | Baba et al. | 148/417 |
| 4,462,843 | 7/1984 | Baba et al. | 148/417 |
| 4,542,183 | 9/1985 | Miller et al. | 524/714 |
| 4,569,703 | 2/1986 | Baba et al. | 148/417 |

Primary Examiner—Stephen J. Lechert, Jr.
Attorney, Agent, or Firm—Andrew Alexander

[57] ABSTRACT

Disclosed is a metal alloy product having increased resistance to fatigue crack growth and having coarse grains distributed in a fine grain structure, the coarse grains having a different alloy composition from the fine grain structure.

43 Claims, 4 Drawing Figures

1

ALLOY HAVING IMPROVED FATIGUE CRACK GROWTH RESISTANCE

INTRODUCTION

This invention relates to fatigue crack growth and in particular it relates to fatigue crack growth resistance in metal alloys such as aluminum, titanium, and steels.

Powder metallurgy (P/M) has received much attention as a means to produce products having improved properties. However, while significant gains may be made with respect to certain properties, somtimes these are obtained at the expense of other properties. For example, in the aluminum industry, P/M alloys 7090 and 7091 exhibit improved combinations of strength, toughness and corrosion resistance in comparison to 7XXX series (Al-Zn-Mg-Cu) alloys produced by conventional ingot metallurgy (I/M) methods. Nevertheless, commensurate improvement in fatigue crack growth resistance is not obtained in the P/M alloys. For this reason, the improvement in other properties which P/M alloys offer may be unusable in aerospace components for which fatigue behavior is important.

Investigations into fatigue crack growth in metals show that an alloy with a fine grain size, while providing many desirable properties, generally has inferior resistance to fatigue crack growth in comparison to the same alloy with a coarse grain size. For example, in NRL Memorandum Report 4232, Naval Research Laboratory, May 19, 1980, entitled "Observations on Generality of Grain-Size Effect on Fatigue Crack Growth in Alpha Plus Beta Titanium Alloys", Yoder et al report that fatigue crack growth rates decrease with increased grain size in titanium alloys. Also, in a paper entitled "A Critical Analysis of Grain-Size and Yield-Strength Dependencies of Near-Threshold Fatigue-Crack Growth for Steels", presented at the 14th National Symposium on Fracture Mechanics, and published in ASTM STP 791, 1983, it is similarly demonstrated that increasing grain size retards fatigue crack growth in steels. However, when metal products, for example, aluminum alloys, have a coarse grain structure, corrosion resistance, strength and toughness can be appreciably lowered. Accordingly, as a general rule, coarse grain structure is usually avoided and fine grain structure is preferred.

Thus, it can be seen that there is a great advantage, particularly in aluminum alloys, if fatigue crack growth resistance can be controlled or improved without adversely affecting other properties. The present invention permits all the properties of a metal alloy to be maximized. That is, the present invention combines the benefits of both fine and coarse grains to provide metal alloys having high levels of strength, toughness and corrosion while maintaining improved resistance to fatigue crack growth.

SUMMARY OF THE INVENTION

An object of this invention is to improve fatigue crack growth resistance in metal alloys.

Another object of this invention is to improve the fatigue crack growth resistance of alloys of titanium, aluminum and steel.

Yet another object of the present invention is to provide metal alloys having controlled amounts of both fine and coarse grains.

And yet another object of this invention is to provide improved P/M alloy products of aluminum, titanium, steel and the like having a duplex structure comprised of a coarse grain structure distributed throughout a matrix consisting of a fine grain structure.

Still, it is a further object of the present invention to provide an improved metal alloy product having non-uniform grain structure and being accompanied by improved resistance to fatigue crack growth.

And still, it is another object of this invention to provide a metal alloy product comprised mainly of at least two different levels of grain size uniformly distributed throughout and having improved resistance to fatigue crack growth.

These and other objects will become apparent from a reading of the disclosure and claims and an inspection of the drawings appended hereto.

Accordingly, there is disclosed an improved alloy product having greatly improved resistance to fatigue crack growth. As an example, the method of increasing the fatigue crack growth resistance of an aluminum alloy powder product comprises the steps of providing a base aluminum alloy powder and admixing therewith to provide a blend with second aluminum alloy powder capable of providing a coarse grain size. In addition, the blend is pressed to make a green compact and then hot pressed and worked to a final product. The product may be heat treated and aged to provide therein a dual grain structure having improved resistance to fatigue crack growth. While the method of the invention has been illustrated by use of powder metallurgy, it will be appreciated that other methods may be used to provide the grain structure of the invention and the benefits attended thereto and such are encompassed within the purview of the present invention.

DETAILED DESCRIPTION OF THE PREFERRED EMBODIMENTS

Figure 1:
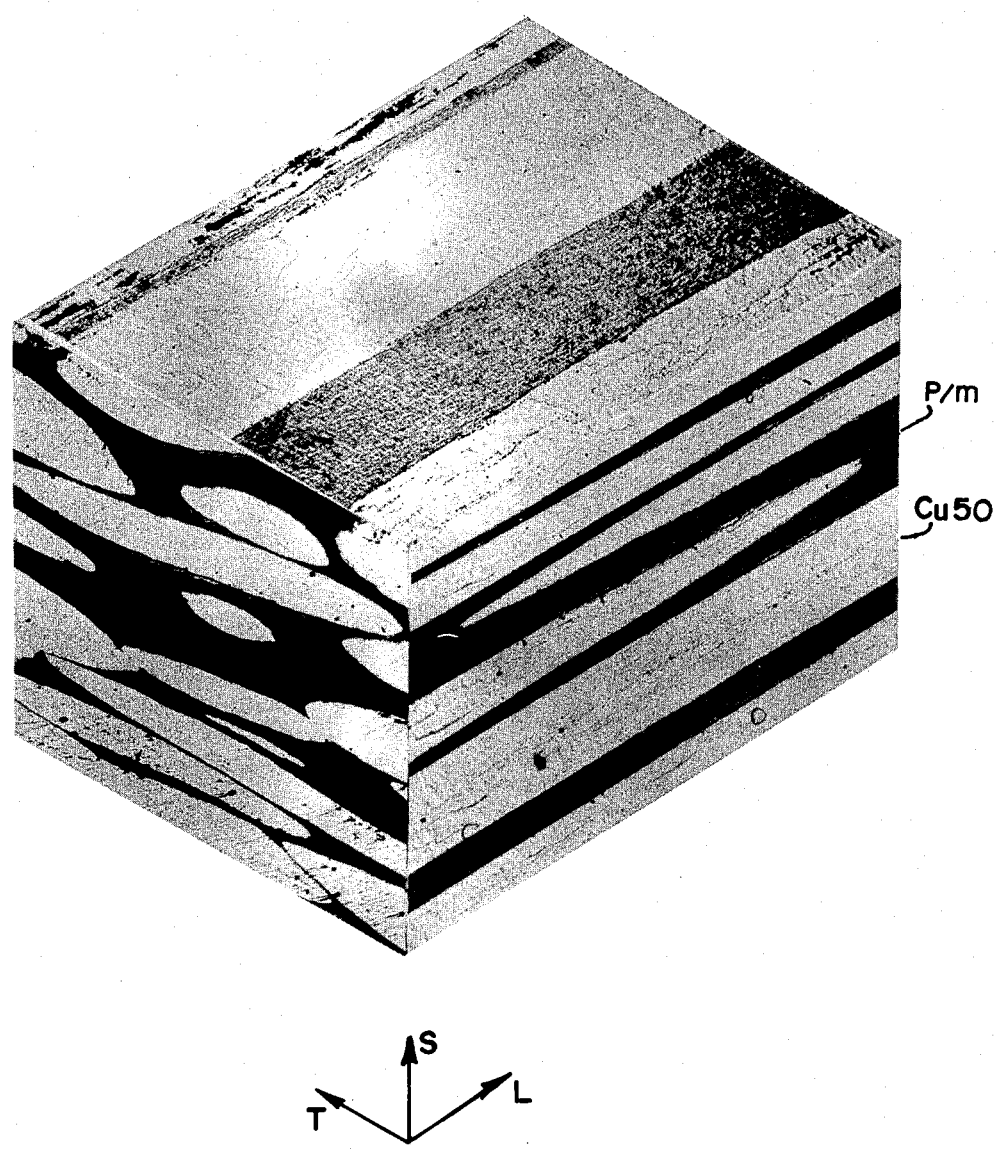
FIG. 1 is a micrograph of an aluminum alloy product in accordance with the invention.

By reference to FIG. 1, there is shown an enlarged cross-section of an aluminum alloy product produced in accordance with the present invention. The dark color shows an area or phase of the product where the alloy was not permitted to recrystallize, and fine grain structure was maintained with its attendant properties. The light color shows an area or phase where grain growth was permitted to occur, providing the alloy product with improved resistance to fatigue crack growth. Thus, the alloy product of the invention has beneficial properties resulting from both fine grain structure and from coarse grain structure.

When powder metallurgy is used to obtain the grain structure in accordance with the invention, substantially the same alloy may be used in both phases or one phase may be comprised of a different alloy, depending to some extent on the properties desired in the final product. However, it is preferred that in the grain structure, the areas of coarse grains be uniformly distributed throughout the product in order to provide the optimum combination of strength, toughness, corrosion resistance and fatigue crack growth resistance.

In making an aluminum alloy powder product, a base aluminum powder alloy such as AA 7090 or 7091 is selected depending on the basic properties desired. For example, powder metallurgy alloy 7090 exhibits higher levels of strength and toughness than conventional alloys such as 7075 and 7050. Further, the base aluminum powder alloy should be selected to produce a fine grain structure. Generally, the base aluminum powder should have a particle size in the range of −200 to −325 mesh (Fisher sub-sieve sizing screen).

In addition, a second powder should be selected to be blended with the first or base powder alloy. For purposes of increasing the resistance of the aluminum alloy powder product to fatigue crack growth, the second powder should be selected so as to permit recrystallization or produce coarse grains. This may be achieved by using substantially the same alloy comprising the base powder alloy but removing therefrom any element or elements which resist recrystallization and grain growth. Such elements include, for example, Co, Cr, Zr, Sc and Mn.

While reference herein has been made to selecting aluminum powder alloys to be combined, it should be understood that powders other than aluminum alloys may be combined with the base powder which in addition to increasing the fatigue crack growth resistance can enhance "other" properties of the final products. Such materials can include, for example, metals such as steel and titanium or other materials having properties desirable in the final product.

The amount of the second powder which is blended with the base alloy powder is that which is sufficient to increase the resistance of the powder metallurgy product to fatigue crack growth. This can range from a very small amount which provides only a small volume of coarse grains in a fine grain structure to a rather significant amount if it is desired to greatly improve resistance to fatigue crack growth. Typically, the blend should comprise at least 5 vol. % of the coarse grain producing constituent with preferred amounts being at least 10 to 20 vol. %. Normally, the blend should not comprise more than 50 vol. % of the coarse grain producing constituent with that amount being reduced considerably, if its properties, e.g., corrosion resistance, are adversely affected.

The second powder should have a particle size which is larger than the size of the base alloy powder so as to provide regions or islands of metal available for grain growth to produce the coarse structure. Thus, typically the second powder can have a particle size in the range of 0.1 to 10 mm, with a preferred size being in the range of 0.5 to 5 mm.

The base powder alloy and the second powder are mixed to provide a blend wherein the large particles are substantially uniformly distributed throughout it. Thereafter, the blend can be compressed to form a compact.

The compact can be subjected to a vacuum preheat for purposes of degassing. Typically, for aluminum, the preheat is carried out at a temperature in the range of 800° to 1100° F. Thereafter, it may be pressed to provide up to 100% density. For aluminum powder, the compact can be hot pressed at a temperature in the range of 800° to 1100° F., and pressing can be carried out at pressures in the range of 30,000 to 90,000 psi.

Products in accordance with the invention preferably have a fine matrix grain size of 10 μm or finer. For the coarse grained constituent, the grain dimensions should be about 500 μm, or larger.

As well as providing the alloy with controlled amounts of alloying elements as described hereinabove, it is preferred that the alloy be prepared according to specific method steps in order to provide the most desirable characteristics. Thus, the alloy described herein can be provided as an ingot or billet for fabrication into a suitable wrought product by techniques currently employed in the art. The ingot or billet may be preliminarily worked or shaped to provide suitable stock for subsequent working operations.

The metal can be rolled or extruded or otherwise subjected to working operations to produce stock such as plate or extrusions or other stock suitable for shaping into the end product. Typically, extruding, for example, of the hot pressed compact, should be performed at a temperature in the range of 550° to 800° F. with a suitable temperature being about 600° F.

After forming or working the compact to the desired product, various thermal operations may be required to obtain the proper metallurgical condition in the metal. In the case of precipitation-hardened alloys, a solution heat treatment is used to substantially dissolve soluble elements. The solution heat treatment is preferably accomplished at a temperature in the range of 800 to 1100° F. and typically at about 900° F. for about 1 hour.

High temperature thermal operations such as solution heat treatment also promote recrystallization and grain growth in the second powder and thereby impart to the product improved resistance to fatigue crack growth. Solution heat treatments can range from several minutes to about 2 hours or more at the solution heat treating temperature. Extending the solution heat treatment time beyond about 2 hours generally does not provide further improvements in final properties.

To further improve the properties necessary to the final product, alloys which are solution heat treated should be rapidly quenched to prevent or minimize uncontrolled precipitation of various phases which, when improperly formed, can degrade properties. A cold water quench is preferred. Thus, it is preferred in the practice of the invention that the quenching rate be at least 10° F./sec with a preferred quench rate being at least 100° F./sec.

It is preferred to subject the solution heat treated product to a stretching treatment to reduce residual stresses produced during quenching.

After stretching, the product can be artificially aged. This may be accomplished by subjecting the product to a temperature in the range of about 200° to 400° F. for a sufficient period of time to provide the desired yield strength. The period for artificial aging can run from several minutes to many hours. Preferably, artificial aging is accomplished by subjecting the product to a temperature in the range of 250° to 325° F. for a period of at least 16 hours.

While the invention has been described in terms of blending powders, similar results may be obtained by making laminations of different alloys to provide regions of small grains and large grains to provide the improved properties of the invention. Or, the powders may be provided so as to provide a layered ingot of fine and coarse powders which will result in a dual structure in accordance with the invention.

While the invention has been described in part with respect to powder metallurgy, its application is not necessarily limited thereto. That is, the present invention discloses a metal or alloy structure having a dual or duplex grain structure comprised of fine grains or other type of matrix and coarse grains wherein the coarse grains in combination with the matrix operate to improve the fatigue crack growth resistance of the structure. Thus, in addition to producing a dual grain structure highly resistant to fatigue crack growth using powder metallurgy techniques, it is possible to produce such a structure by controlled working of an ingot, e.g. hot working, to produce selected recrystallized phases while at the same time maintaining a fine grain phase. Additionally, the properties of such dual structure may be expanded by controlled intermetallics formation. In addition, while the invention has referred generally to powders, it should be understood that the use of powders herein is meant to include granulated ingot which can have particles which are pea sized, 0.25 inch for example, but may include larger or smaller particles. Other materials that may be used include chopped or shredded metal or foil, ribbons or sheet or pieces of metal, all of which can be used so long as they permit a dispersion of one alloy in another or permit interleafing of alloys which can be fabricated into a dual structure in accordance with the invention.

Furthermore, while the invention has been described in part with respect to aluminum and its alloys, it will be understood that the basic invention is not necessarily limited thereto. For example, the dual structure effect has application to other metal structures such as steel, titanium and other alloys, and such is contemplated within the purview of the invention.

The following examples are still further illustrative of the invention.

EXAMPLE 1

An aluminum base alloy containing by wt. % 0.99 Cu, 2.55 Mg, 8.02 Zn, 0.63 Co, 0.03 Si, 0.03 Fe, the balance aluminum, was provided in powder form and screened to −200 mesh (Fisher Series) ( 85%−325 mesh) and a grain size having dimensions of less than 10 microns. A batch of this powder was packed into a cylindrical mold to form a 60 pound billet. The mold was sealed and preheated to 900° F. in vacuum. Thereafter, the batch was hot pressed to 100% density at 900° F., to form the billet. The billet was extruded at 600° F. to a final product shape, solution heat treated for one hour at 900° F. and cold water quenched. The extruded shape was stretched 2% at room temperature and thereafter aged for 24 hours at 250° F. The resulting properties are as follows:

|  | Longitudinal Orientation | Long-Transverse Orientation |
| --- | --- | --- |
| UTS (ksi) | 96.3 | 91.4 |
| TYS (ksi) | 91.6 | 86.2 |
| Elong. (%) | 8.5 | 5.0 |
| $K_{Ic}$ (ksi in) | 26.1 | 20.2 |

Figure 2:
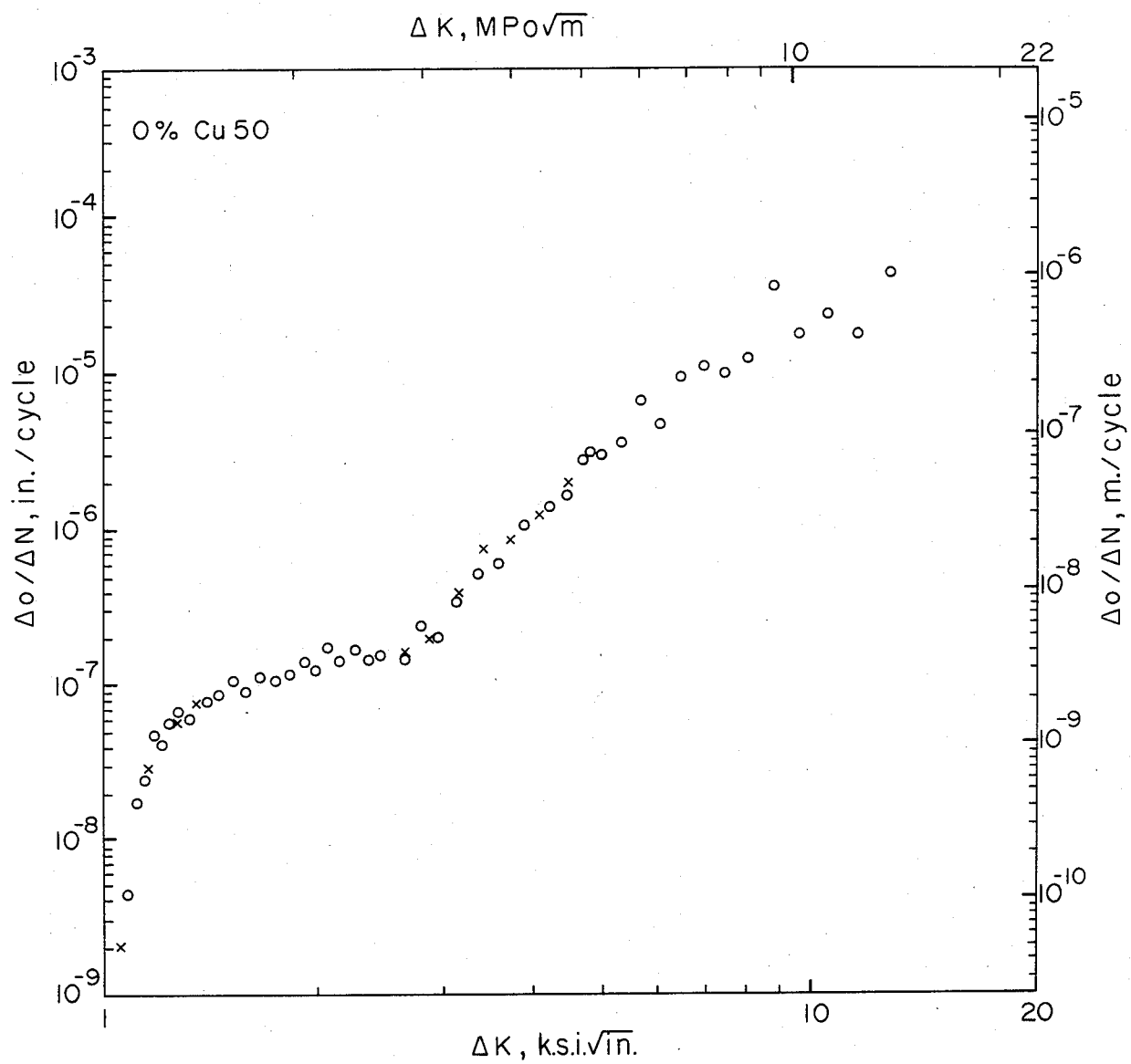
FIG. 2 is a graph showing crack growth rate as a function of stress intensity factor range ($\Delta K$) of an aluminum alloy with a uniform grain size.

A graph of fatigue crack growth rate ($\Delta a/\Delta N$) as a function of stress intensity factor range ($\Delta K$) is shown in FIG. 2.

EXAMPLE 2

Figure 3:
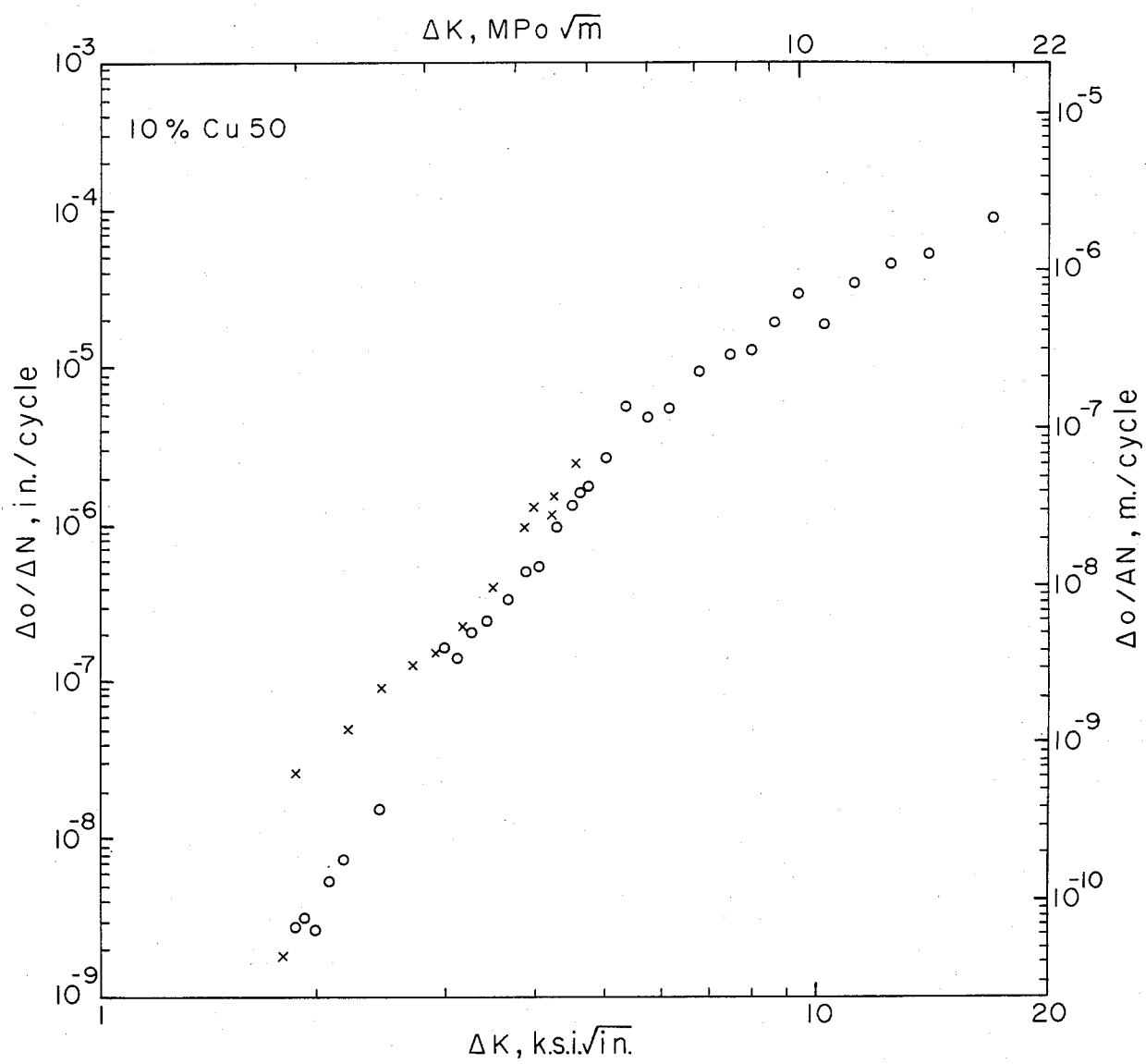
FIGS. 3 and 4 are graphs showing crack growth rate as a function of stress intensity factor range ($\Delta K$) of alloy products in accordance with the invention.

The aluminum base alloy powder of Example 1 was blended with a second aluminum base powder containing, by wt. %, 0.94 Cu, 2.45 Mg, 7.85 Zn, 0.05 Si, 0.05 Fe, the balanace aluminum. The second powder comprised 10% of the blend; the individual powder particles had average volumes of 100 mm³. After mixing to ensure substantially uniform distribution, the blend was processed as in Example 1, and FIG. 3 shows a graph of fatigue crack growth rate ($\Delta a/\Delta N$) versus stress intensity factor range ($\Delta K$). It will be noted that there is a substantial decrease in fatigue crack growth rate, particularly in the lower values of $\Delta K$. The properties of the final product are as follows:

|  | Longitudinal Orientation | Long-Transverse Orientation |
| --- | --- | --- |
| UTS (ksi) | 95.2 | 89.8 |
| TYS (ksi) | 90.8 | 84.9 |
| Elong. (%) | 8.8 | 4.6 |
| $K_{Ic}$ (ksi in) | 23.7 | 19.9 |

The structure of the final product was similar to that shown in FIG. 1.

EXAMPLE 3

This example was the same as Example 2 except the blend contained 50% of both powders. The properties of the final product are as follows:

|  | Longitudinal Orientation | Long-Transverse Orientation |
| --- | --- | --- |
| UTS (ksi) | 92.4 | 80.8 |
| TYS (ksi) | 89.2 | 78.3 |
| Elong. (%) | 7.0 | 1.8 |
| $K_{Ic}$ (ksi in) | 25.4 | 20.1 |

Figure 4:
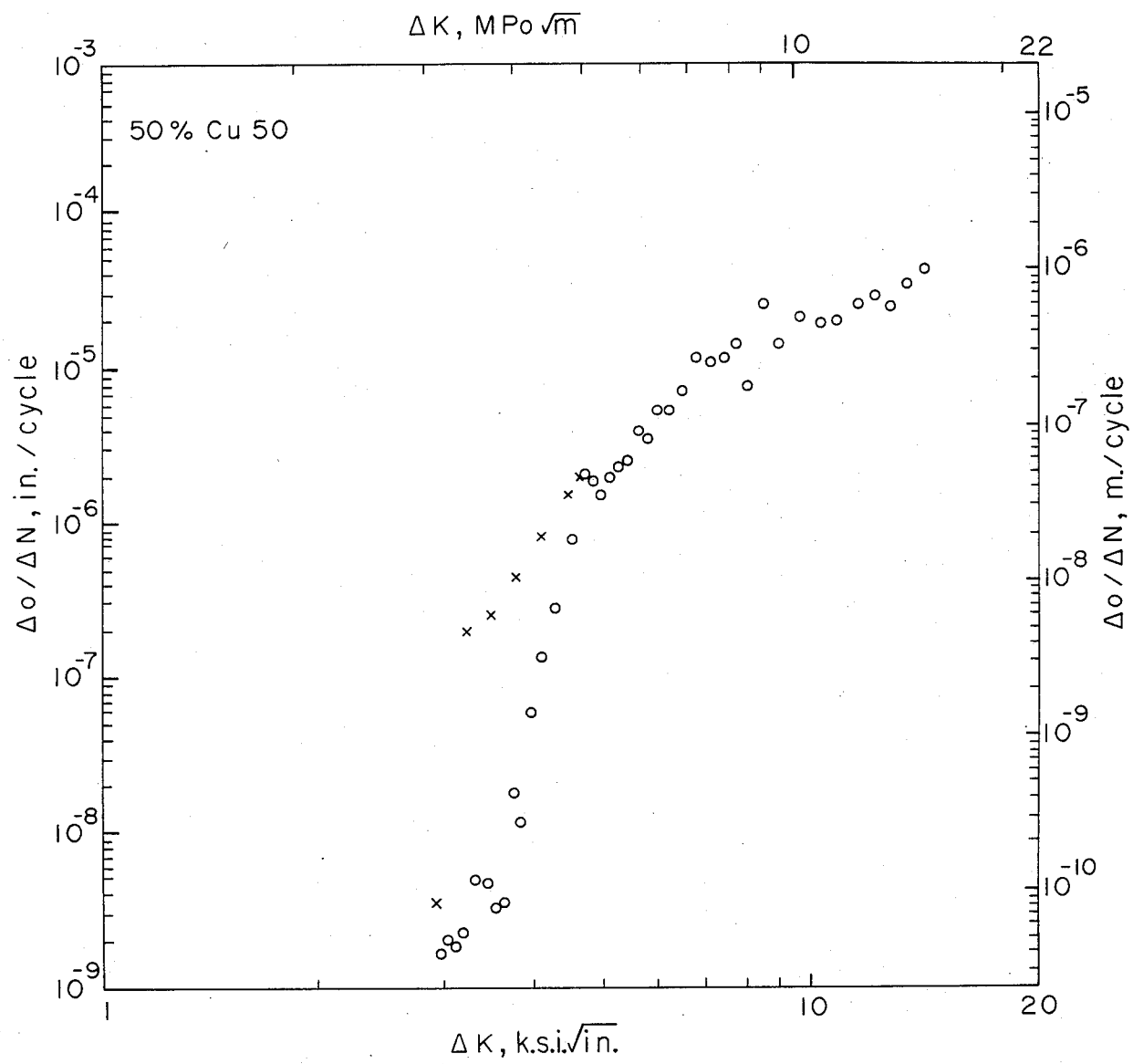

The fatigue crack growth rate versus stress intensity factor range ($\Delta K$) is shown in FIG. 4. It will be noted that the fatigue crack growth rate has decreased even further when compared to Example 2.

While the invention has been described in terms of preferred embodiments, the claims appended hereto are intended to encompass all embodiments which fall within the spirit of the invention.

What is claimed is:

1. A method of increasing the fatigue crack growth resistance of a metal powder product comprising the steps of:
   (a) providing a base metal powder alloy;
   (b) admixing with said base metal alloy powder a second powder to provide a blend, the second powder capable of providing a grain size in said product greater than that resulting from the base metal powder;
   (c) pressing the blend to make a green compact;
   (d) hot pressing the green compact;
   (e) working the hot pressed compact to a shaped product and;
   (f) heat treating the shaped product to provide a final product having coarse grains in a fine grain structure having improved resistance to fatigue crack growth.

2. The method in accordance with claim 1 wherein the blend comprises less than 50 wt. % of the coarse grain producing powder.

3. The method in accordance with claim 1 wherein the coarse grain producing powder is at least 5 wt. % of the blend.

4. The method in accordance with claim 1 wherein the coarse grain producing powder provided in the blend has a particle size greater than the particle sizes in the base powder to provide regions of metal available for grain growth to provide said coarse grains.

5. The method in accordance with claim 1 wherein the base metal powder is selected from aluminum, steel and titanium alloys.

6. The method in accordance with claim 1 wherein the second metal powder capable of producing coarse grains is selected from aluminum, steel and titanium alloys.

7. The method in accordance with claim 4 wherein the particles of coarse grain producing alloy powder are substantially uniformly distributed throughout the base powder alloy.

8. The method in accordance with claim 1 including the step of vacuum preheating the green compact for purposes of degassing.

9. The method in accordance with claim 8 wherein the preheat is carried out at a temperature in the range of 800° to 1100° F.

10. The method in accordance with claim 1 wherein the product has fine grain size consisting of grain dimensions of 10 μm or finer.

11. The method in accordance with claim 1 wherein the coarse grain size consists of grain dimensions of 500 μm or larger.

12. The method in accordance with claim 1 wherein the working step includes extruding or forging.

13. A method of increasing the fatigue crack growth resistance of an aluminum alloy product comprising the steps of:
(a) providing a base aluminum alloy;
(b) admixing with said base aluminum alloy a second alloy to provide a blend, the second alloy capable of providing a grain size in said product greater than that resulting from the base aluminum alloy;
(c) pressing the blend to make a green compact:
(d) hot pressing the green compact;
(e) working the hot pressed compact to a shaped product and;
(f) heat treating the shaped product to provide therein coarse grains in a fine grain structure, the product having improved resistance to fatigue crack growth.

14. The method in accordance with claim 13 wherein the blend comprises less than 50 wt. % of the coarse grain producing alloy.

15. The method in accordance with claim 13 wherein the coarse grain producing alloy is at least 5 wt. % of the blend.

16. The method in accordance with claim 13 wherein the coarse grain producing alloy and the base aluminum alloy are powders and the coarse grain producing powder provided in the blend has a particle size greater than the particle sizes in the base aluminum powder to provide regions of metal available for grain growth to provide said coarse grains.

17. The method in accordance with claim 16 wherein the particles of the coarse grain producing alloy powder are substantially uniformly distributed throughout the base powder alloy.

18. The method in accordance with claim 13 wherein the heat treating is carried out at a temperature in the range of 800° to 1100° F.

19. The method in accordance with claim 13 including the step of aging the product after the heat treating step.

20. The method in accordance with claim 13 including the step of artificial aging said product at a temperature of 200° to 400° F. for a time sufficient to increase yield strength.

21. The method in accordance with claim 16 wherein the base aluminum alloy powder has a particle size in the range of −200 to −325 mesh (Fisher Series).

22. The method in accordance with claim 16 wherein the second aluminum powder is selected to produce larger grains than the base aluminum alloy powder upon recrystallization.

23. The method in accordance with claim 16 wherein the second powder has substantially the same composition as the base aluminum alloy powder except the second powder has a lower resistance to grain growth.

24. The method in accordance with claim 16 wherein the base aluminum alloy powder is selected from the 7000 series aluminum alloy type.

25. The method in accordance with claim 16 wherein the base aluminum alloy powder is 7090 type aluminum alloy.

26. The method in accordance with claim 16 wherein the second aluminum alloy powder is selected from the 7000 series aluminum alloy and has less grain growth resistance than the base aluminum alloy powder.

27. The method in accordance with claim 16 wherein the second aluminum alloy powder is 7090 type having lowered amounts of elements which resist recrystallization and grain growth and which permit increased grain growth to a grain size greater than the base aluminum alloy in the final product.

28. A method of increasing the fatigue crack growth resistance of an aluminum alloy powder product comprising the steps of:
(a) providing a base aluminum alloy powder;
(b) admixing with said base aluminum alloy powder a second alloy powder to provide a blend, the second powder having a particle size greater than the base powder and capable of providing a grain size in said product greater than that resulting from the base aluminum alloy powder, the blend containing 5 to 50 wt. % of the second powder, and being mixed to produce a substantially uniform distribution of the large particles throughout the base powder;
(c) pressing the blend to make a green compact;
(d) hot pressing the green compact;
(e) hot working the hot pressed compact to a final shaped product, the hot working being performed at a temperature in the range of 550° to 800° F.; and
(f) solution heat treating the final shaped product at a temperature in the range of 800° to 1100° F. and thereafter aging to provide therein coarse grains resulting from the second powder in a fine grain structure, the product having improved resistance to fatigue crack growth.

29. A metal alloy product having increased resistance to fatigue crack growth and having coarse grains distributed in a fine grain structure, the coarse grains having a different alloy composition from the fine grain structure.

30. An aluminum base alloy product resulting from two aluminum alloys, the product having increased resistance to fatigue crack growth and having coarse grains distributed in a fine grain structure, the coarse grains developed from one of the aluminum alloys and the fine grain structure developed from the remaining aluminum alloy.

31. The product in accordance with claim 30 wherein the two aluminum alloys have substantially the same composition except that one alloy has a lowered resistance to grain growth.

32. The product in accordance with claim 30 wherein the coarse grain-producing alloy constitutes less than 50 wt. % of the product.

33. The product in accordance with claim 30 wherein the coarse grain-producing alloy constitutes at least 5 wt. % of the blend.

34. An aluminum base alloy product resulting from a blend of a base aluminum alloy powder and a second aluminum alloy powder, the product having increased resistance to fatigue crack growth and having coarse grains distributed in a fine grain structure, the coarse grains developed from one of the second aluminum alloy powder and the fine grain structure developed from the base aluminum alloy powder.

35. The product in accordance with claim 34 wherein the blend is comprised of a coarse grain-producing powder and a base aluminum powder.

36. The product in accordance with claim 35 wherein the coarse grain-producing powder provided in the blend has a particle size greater than the particle sizes in the base powder.

37. The product in accordance with claim 34 wherein the second powder is selected to produce larger grains than the base aluminum alloy powder upon recrystallization.

38. The product in accordance with claim 34 wherein the second powder has substantially the same composition as the base aluminum alloy powder except the second powder has lower resistance to grain growth.

39. The product in accordance with claim 34 wherein the base aluminum alloy powder is selected from the 7000 series aluminum alloy type.

40. The product in accordance with claim 34 wherein the base aluminum alloy powder is 7090 type aluminum alloy.

41. The product in accordance with claim 34 wherein the second aluminum alloy powder is selected from the 7000 series aluminum alloys and has less grain growth resistance than the base aluminum alloy powder.

42. The product in accordance with claim 34 wherein the second aluminum alloy powder is 7090 having lowered amounts of elements which resist recrystallization and grain growth and which permit increased grain growth to a grain size greater than the base aluminum alloy in the final product.

43. The product in accordance with claim 34 wherein the base aluminum alloy powder and the second aluminum alloy powder have substantially the same composition except one powder has a lowered resistance to grain growth.

* * * * *